US008578066B2

(12) United States Patent
Simpson et al.

(10) Patent No.: US 8,578,066 B2
(45) Date of Patent: Nov. 5, 2013

(54) SUPPLY STATUS INDICATOR

(75) Inventors: Shell S. Simpson, Boise, ID (US); Jeetendra Kumar, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2510 days.

(21) Appl. No.: 10/944,264

(22) Filed: Sep. 17, 2004

(65) Prior Publication Data

US 2006/0083521 A1 Apr. 20, 2006

(51) Int. Cl.
*G06F 3/00* (2006.01)

(52) U.S. Cl.
USPC .......... 710/15

(58) Field of Classification Search
USPC .......... 235/381
See application file for complete search history.

(56) References Cited

U.S. PATENT DOCUMENTS

| | | | | |
|---|---|---|---|---|
| 5,655,174 | A | 8/1997 | Hirst | 399/27 |
| 5,727,135 | A * | 3/1998 | Webb et al. | 358/1.14 |
| 5,731,824 | A | 3/1998 | Kneezel et al. | 347/7 |
| 5,997,141 | A | 12/1999 | Heacock | 347/7 |
| 6,028,674 | A | 2/2000 | Tognazzini | 358/1.13 |
| 6,234,603 | B1 | 5/2001 | Altfather et al. | 347/19 |
| 6,310,692 | B1 | 10/2001 | Fan et al. | 358/1.14 |
| 6,409,302 | B2 | 6/2002 | Altfather et al. | 347/19 |
| 6,520,612 | B1 | 2/2003 | Merz et al. | 347/7 |
| 6,622,266 | B1 * | 9/2003 | Goddard et al. | 714/44 |
| 6,641,312 | B1 | 11/2003 | Chang et al. | |
| 2001/0034713 | A1 * | 10/2001 | Nakai et al. | 705/52 |
| 2002/0152430 | A1 * | 10/2002 | Akasaka et al. | 714/43 |

FOREIGN PATENT DOCUMENTS

| | | | |
|---|---|---|---|
| EP | 779156 | 6/1997 | B41J 2/175 |
| WO | WO-0231741 | 4/2002 | G06F 17/60 |

* cited by examiner

*Primary Examiner* — Henry Tsai
*Assistant Examiner* — Juanito Borromeo

(57) ABSTRACT

A device has a consumable device component. A supply status indicator indicates a status of the consumable device component to at least one of a first host computer and the device. The supply status indicator includes a suppressed state.

9 Claims, 5 Drawing Sheets

SUPPLY STATUS INDICATOR

TECHNICAL FIELD

Embodiments of the present subject matter relate to a supply status indicator.

BACKGROUND

A peripheral device, such as a laser printer or an inkjet printer, often includes consumables, such as a toner cartridge or an inkjet cartridge, respectively. When the consumable has a certain status, such as being low on ink or toner, the peripheral device may indicate the status of the consumable. A client may prematurely replace the consumable in response to the status indication.

DETAILED DESCRIPTION

The following description includes terms, such as “up”, “down”, “upper”, “lower”, “first”, “second”, etc. that are used for descriptive purposes only and are not to be construed as limiting. The embodiments of a device or article of the present invention described herein can be manufactured, used, or shipped in a number of positions and orientations.

Embodiments of the present subject matter relate to a supply status indicator of a consumable device component of a managed peripheral device.

Figure 1A:
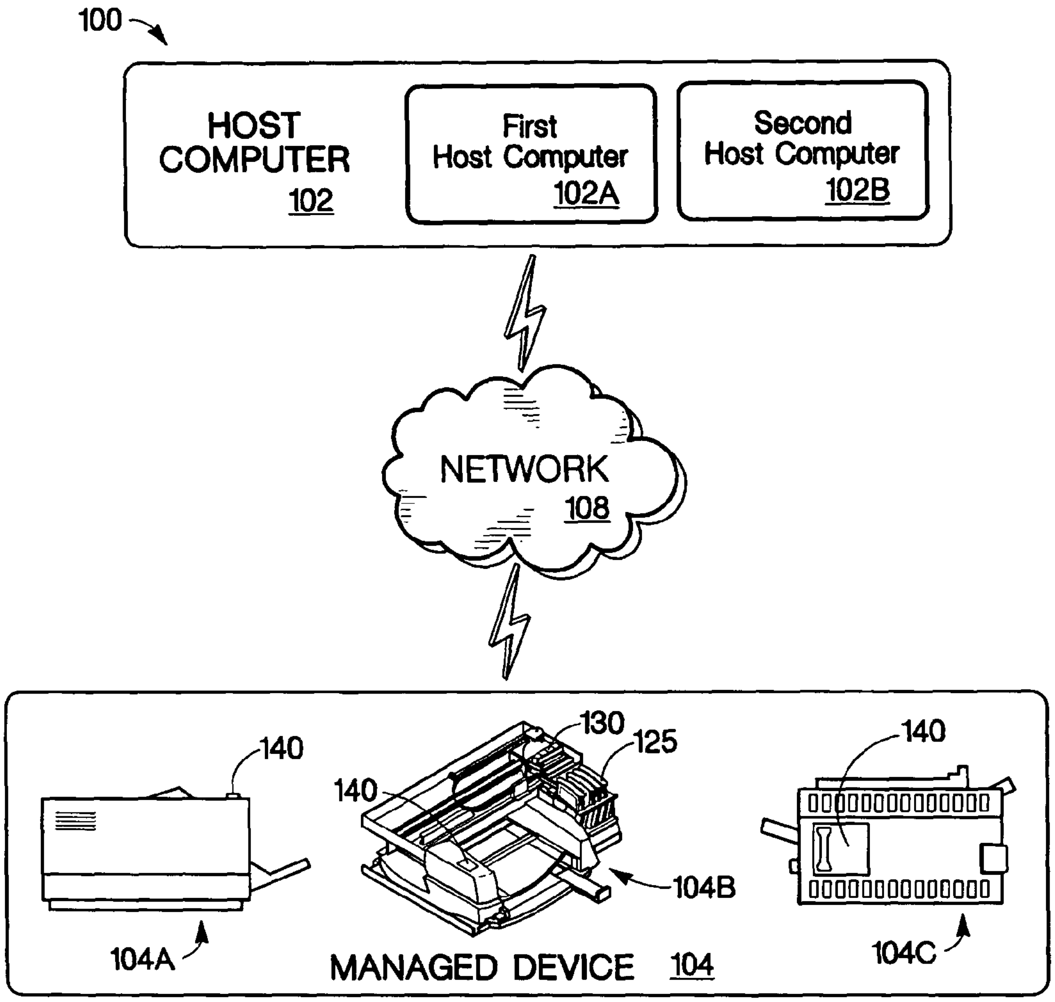
FIG. 1A illustrates an embodiment of a system including a network, host computers and managed peripheral devices.
Figure 1B:
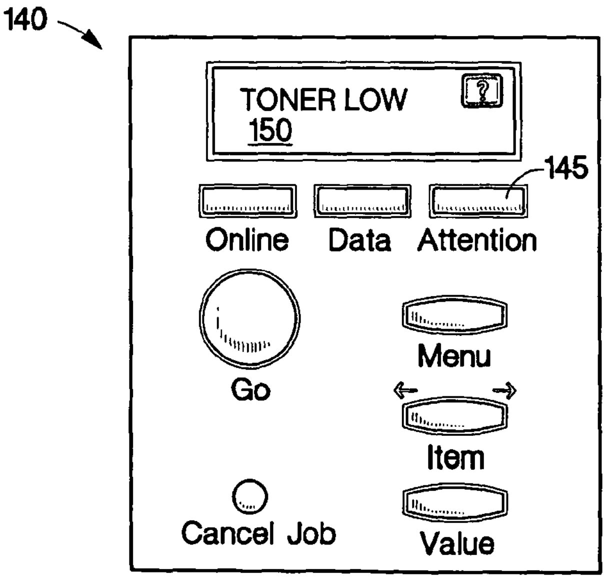
FIG. 1B illustrates an embodiment of a control panel on a device.

FIG. 1 illustrates an example of a system 100. The system 100 includes one or more host computers 102 operatively coupled to one or more managed printing devices 104 through a communication link such as network 108. The network 108 can include, for example, a printer cable, a LAN (local area network), a WAN (wide area networks), an intranet, the Internet, or any other suitable communication link.

Within the exemplary system 100, the host computer 102 can be implemented as a variety of general purpose computing devices including, for example, a personal computer (PC), a server, a Web server, and other devices configured to communicate respectively with managed device 104. The host computer processes computer-executable instructions in the form of program modules that include routines, programs, objects, components, data structures and the like.

The host computer 102 provides a user with the ability to manipulate or otherwise prepare in electronic form, an image or document to be rendered as an image that is printed or otherwise formed onto a print medium by the managed device 104. The host computer 102 creates a print job containing a customized document and sends the print job to the managed device 104 for printing. The print job is configured in a page description language, such as printer control language (PCL®) of Hewlett Packard Company® or PostScript® of Adobe®, for example, depending on the managed device 104. The managed printing device 104 may receive the print job and may print the customized document.

When the host computer 102 is appropriately activated, a data transfer process is initiated between the managed device 104 and the host computer 102 over the communication link, such as the network 108. The process begins with a query from the host computer 102 to the managed device 104 requesting identification information. The query is made in a device management language, or management protocol application, such as PML (printer or peripheral management-information-base language) or XML (Extensible Markup Language). PML is a subset language of SNMP (simple network management protocol) that defines printer device objects with decimal-separated strings that are used in command queries, for example, to obtain object values. Further details with regard to XML may be found at http://www.w3.org/XML/.PML and XML are management protocol applications for monitoring and controlling printer devices and their functions. Upon receiving a PML or XML query for identification information, the managed device 104 responds by sending its model number or some other device identifier to the host computer 102. In an embodiment, the management protocol application is password protected.

Based on the identification information received from the managed device 104, the host computer 102 requests (e.g., through a PML or XML query) various information/data from the device 104 related to usage of the device 104. The usage information is typically cumulative data, but it may also be data gathered over a specified time period, such as the previous month. The usage information typically includes data detailing the number of pages that have been printed, the types of pages that have been printed and so on. For example, a particular type of managed device 104 may be able to print various-sized documents such as letter-sized, legal-sized and A4-sized documents. The managed device 104 responds to the request by transferring the usage information/data 318 over the communication interface 112 to the host computer 102.

The one or more host computers 102 include a first host computer 102A, or client host computer that provides a client or end-user with the ability to print an image from the managed device 104, and include a second host computer 102B, which may also be a managing host computer. The second host computer 102B provides an administrator with the ability to maintain, and monitor the maintenance of the coupled managed devices 104. The managed devices 104 illustrated represent a fleet of peripheral devices maintained by the administrator.

In an additional embodiment, the one or more host computers 102 may include a virtual computer where one or more computers, such as a central computer, virtually act as a real computer to different end-users and/or administrators. The administrator and user may use the same virtual computer through dumb terminals, or light terminals. The host computers 102A and 102B referred to herein include dumb terminals or light terminals, in an embodiment. Access to applications on the central computer depends upon who is accessing, as determined by security features.

FIG. 1 illustrates examples of the managed devices 104. Managed devices 104 can include various printing devices such as a laser printer 104A, an inkjet printer 104B, a dot matrix printer, a dry medium printer, and a plotter. In addition, managed devices 104 can include various multi-function peripheral (MFP) devices 104C that combine a printing function with other functions such as faxing, scanning, and copying.

FIG. 1 illustrates a fluid delivery system 104B in an embodiment. In embodiments, the system 104B is a recording device, a fluid ejection device, or a printer. In an embodiment, the system 104B stores one or more fluid delivery components 125 that are coupled with fluid cartridges 130 to deliver fluid to media. In multipart architectures there is a separate toner/ink cartridge and a separate "process" cartridge, as illustrated in the device 104B of FIG. 1. In embodiments, the managed device 140 includes a consumable device component, such as the fluid cartridge 130.

The system 104B includes a control panel 140. The control panel 140 may have at least one audible indicator and/or at least one visual indicator, which are supply status indicators to inform the user of an error or a warning associated with printing. In an embodiment further illustrated in FIG. 1A, the control panel 140 includes an audible indicator and/or a visual indicator, such as a light emitting diode (LED) light 145, to provide information to the user. In an additional embodiment, the control panel 140 includes a liquid crystal display (LCD) 150, with a small alphanumeric display of one or more short lines of text, to provide information to the user. In embodiments described herein, the supply status indicator (s) may be suppressed and/or may be activated.

Figure 2:
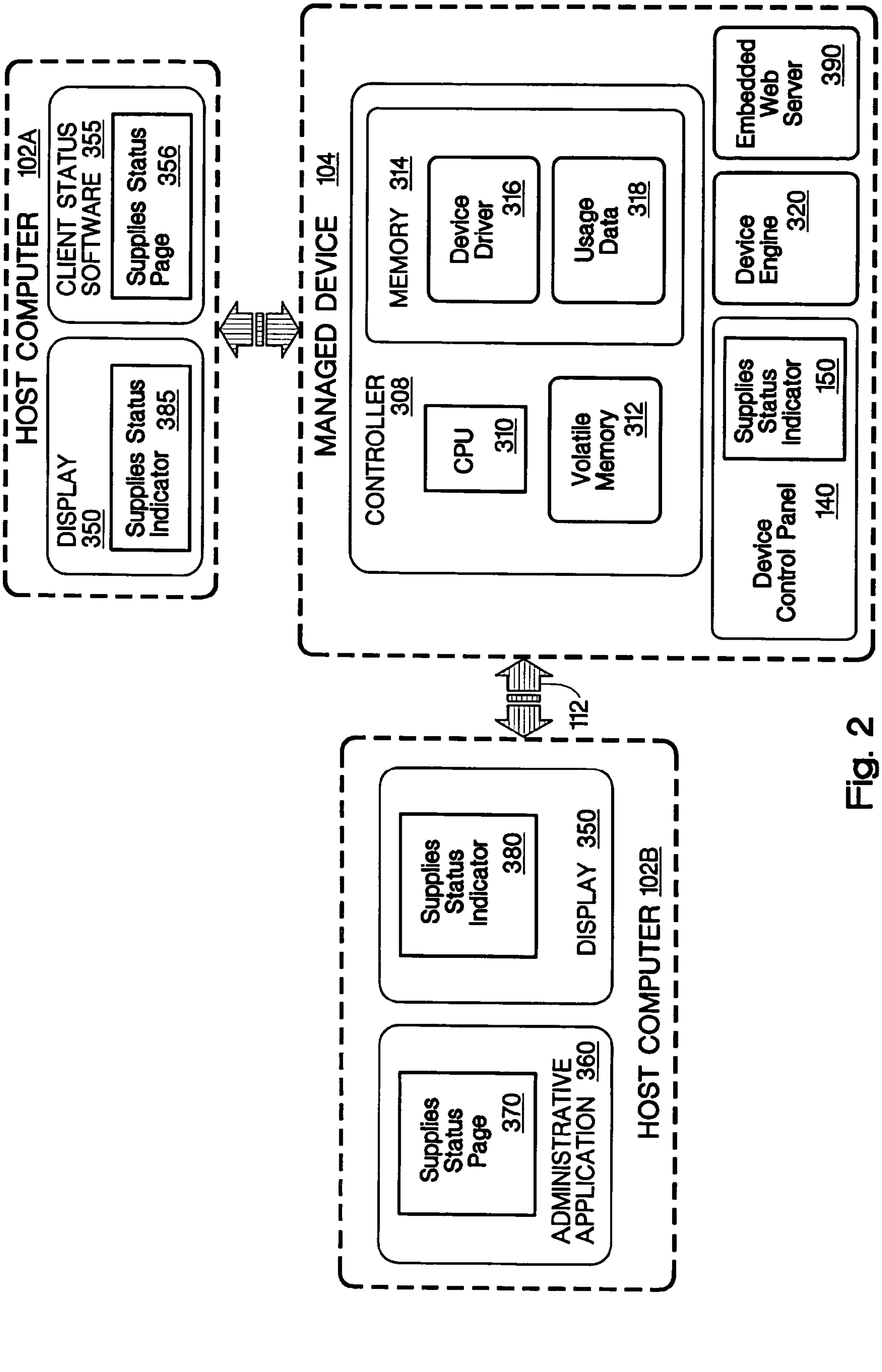
FIG. 2 illustrates additional details of an exemplary embodiment of the system of FIG. 1.
Figures 3A, 3B, 3C, 3D:
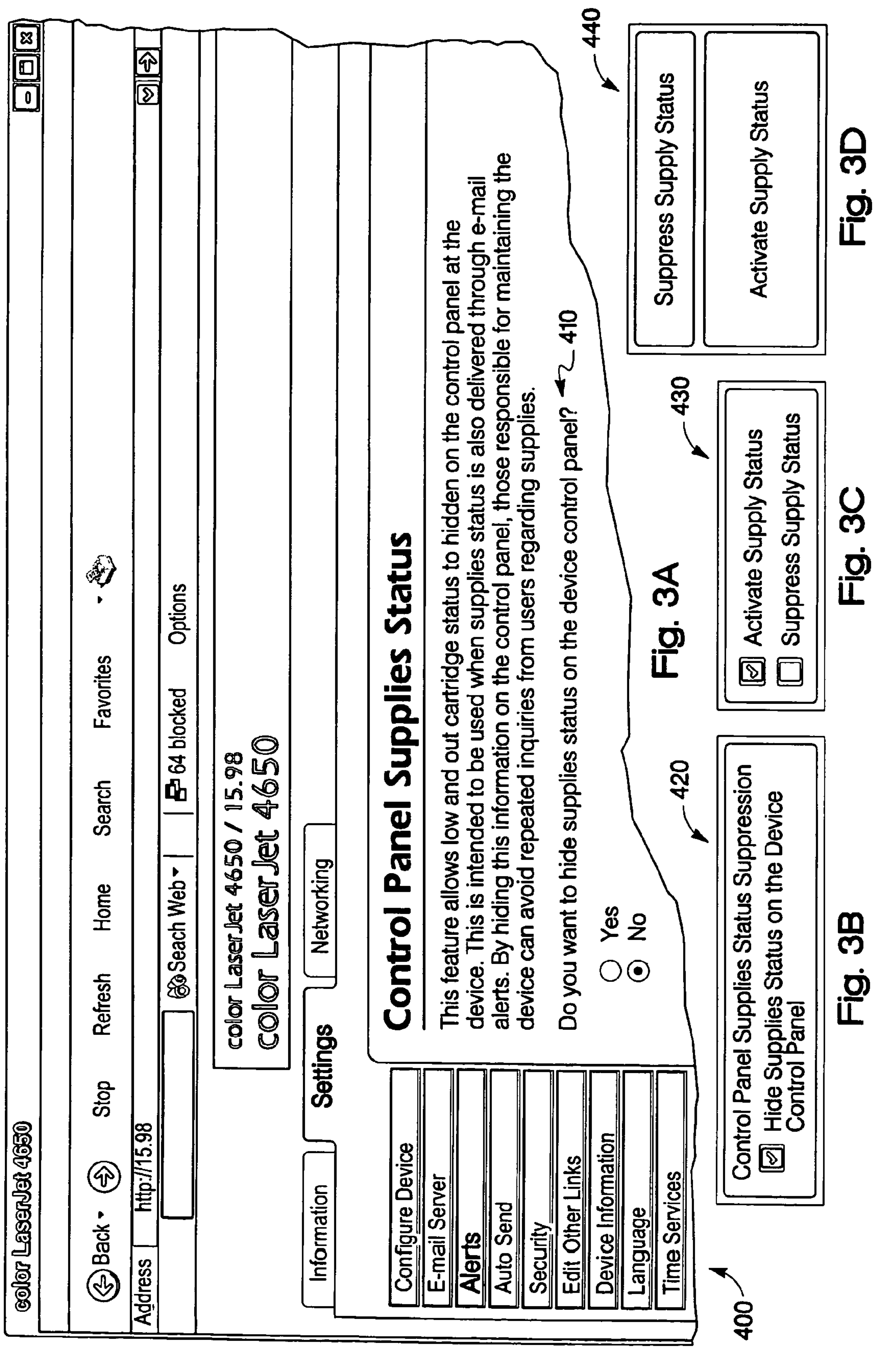
FIGS. 3A, 3B, 3C, and 3D illustrate additional details of exemplary embodiments to suppress a supply status indicator, and to activate the supply status indicator.

FIG. 2 illustrates additional details of an exemplary embodiment of the host computers 102A and 102B, and the managed device 104. In an embodiment, the host computers are configured to communicate with the managed device 104 via communication interface 112. In this embodiment, the managed device 104 is embodied as a printer. The managed device 104 includes a controller 308 for processing data from the host computer 102. The controller 308 may include a data processing unit or CPU(s) 310, a volatile memory 312 (i.e., RAM), and a nonvolatile memory 314. The nonvolatile memory 314 may include various computer storage media such as ROM, flash memory, a hard disk, a removable floppy disk, a removable optical disk and the like. The nonvolatile memory 314 provides storage of computer readable instructions, data structures, program modules and other data for the managed device 104. The memory 314 includes a device driver module 316 and usage data 318 that is accumulated over time by the controller 308 as the managed device 104 performs various printing functions. The managed printing device 104 also includes a printer device engine 320 that performs the actual printing of a document or forming of an image onto a print medium. The controller 308 processes image/document data received as a print job from the host computer 102 and manages the printing device 104 functions by the engine 320.

In this embodiment, the host computers 102A, 102B each have a display 350. In an embodiment, the display 350 of the computer 102A includes a supply status indicator 385, and the display 350 of the computer 102B includes a supply status indicator 380, as described in more detail below.

The host computer 102A may also have a client software application 355 directed to an end-user of a device, in an embodiment. For example, the client software application is Toolbox. In an embodiment, the client software application 355 includes a supply status page 356.

The host computer 102B also has an administrative software application 360 including a supply status page 370. In an embodiment, the supply status page 370 of the administrative software application has more information and control with regard to the device 104, as compared with the supply status page 356 of the client software application 355. In an embodiment, the administrative software application 360 is an enterprise application such as HP Web Jetadmin, which provides a device maintainer with the ability to remotely install, configure, manage, and troubleshoot TCP/IP and IPX connected devices on an intranet.

In an embodiment, the supplies status page 370 provides information about the consumable device component, or consumable, allowing maintainers to view this information for maintenance purposes. In an embodiment, the supplies status page includes information regarding a consumable life expectancy and status of other consumables associated with one or more devices 140. The cartridge information is the main focus of the supplies status page 370, in an embodiment. The supplies status page provides the most detailed supplies status information available such as the remaining life of the cartridge, the estimated pages remaining, and the number of pages printed. In an embodiment, the supplies status page 370 allows a maintainer to hide or suppress the supply status indicator, such as hiding the status indicator 150 on the control panel 140, as described below.

In an embodiment, the managed device 104 includes an embedded web server (EWS) 390. The EWS 390 is firmware that resides in the device 104. After assigning an IP address to a printer, a user with security clearance connected to the network 108 can browse to the printer 104 and modify its configuration remotely. In an embodiment, access to the EWS is password protected.

Through the EWS, maintainers from a remote location can view (and print using the web browser facilities) substantially the same supplies status page 370 as one viewed (and printed) via the device control panel 140. The EWS is accessible from most browsers and administrator's computers.

When a user accesses the EWS, the device status page is opened in an embodiment. In an additional embodiment, users or administrators can open the supplies status page (356, 370) to access the detailed information from the EWS. In an embodiment, the supplies status page and the device status page are substantially exclusively accessible by the administrator.

In summary, in embodiments, the supply status information (e.g. supply status, authentication, supply status suppression) may be found on the supplies status page 356 and/or the supplies status page 370, which may be accessible from the embedded web server, the client software (e.g. Toolbox), and/or the enterprise administrative software (e.g. Web JetAdmin), in an embodiment. The supply status information may also be found on the control panel 140 of the device 104, through pop-up alerts, and email notifications.

As illustrated in embodiments of FIGS. 3A, 3B, 3C, and 3D, a suppression option page 400 is accessed. The suppression option page 400 is accessed through at least one of an administrative screen of the administrator application 360, the embedded web server 390, and the supply status page 370, for example, in an embodiment.

The suppression option page 400 includes a supply status indicator switch 410, 420, 430 or 440 to switch between a suppressed state of the supply status indicator and an activated state of the first supply status indicator. The switch 410 of FIG. 3A includes a query such as "Do you want to hide supplies status on the device control panel" along with a yes option to check to suppress the indicator and a no option to alternatively check to activate the indicator. The switch 420 of FIG. 3B includes a statement such as "Hide Supplies Status on the Device Control Panel" and an associated box to check, indicating agreement with the statement, or to uncheck (or leave blank) indicating disagreement with the statement. The switch 430 of FIG. 3C includes a phrase "Suppress Supply Status" with an associated box to check to suppress the indicator and, alternatively, a phrase "Activate Supply Status" with an associated box to check to restore or active the supply status indicator. The switch 440 of FIG. 3D includes a toggle button with a phrase "Suppress Supply Status" wherein when the button is selected, the Supply Status is suppressed. In an embodiment, the button visually indicates that it is selected, by for example, graying out the "Suppress Supply Status" box and bolding a separate box, for example, "Activate Supply Status."

In an embodiment, when the supply status indicator is suppressed, it is suppressed with respect to the end-user. For example, the supply status indicator 150 on the device control panel 140 is suppressed. Also, the supply status indicator 385 on the display 350 of the end-user host computer 102A is suppressed. As discussed in more detail below, in an additional embodiment, the supply status indicator 385 may be in the form of a pop up alert, or email notification of a supply status condition or event.

In an embodiment, even when the supply status indicator (s) is suppressed, the supply status indicator is not suppressed with respect to the administrator, or device maintainer. In this embodiment, the administrator may still receive email notifications of a supply status condition or event, and/or may receive pop up alerts, and/or may access status information with respect to the particular supply on the supply status page 370 accessible through the application 360, or the EWS 390, for example.

Figure 4:
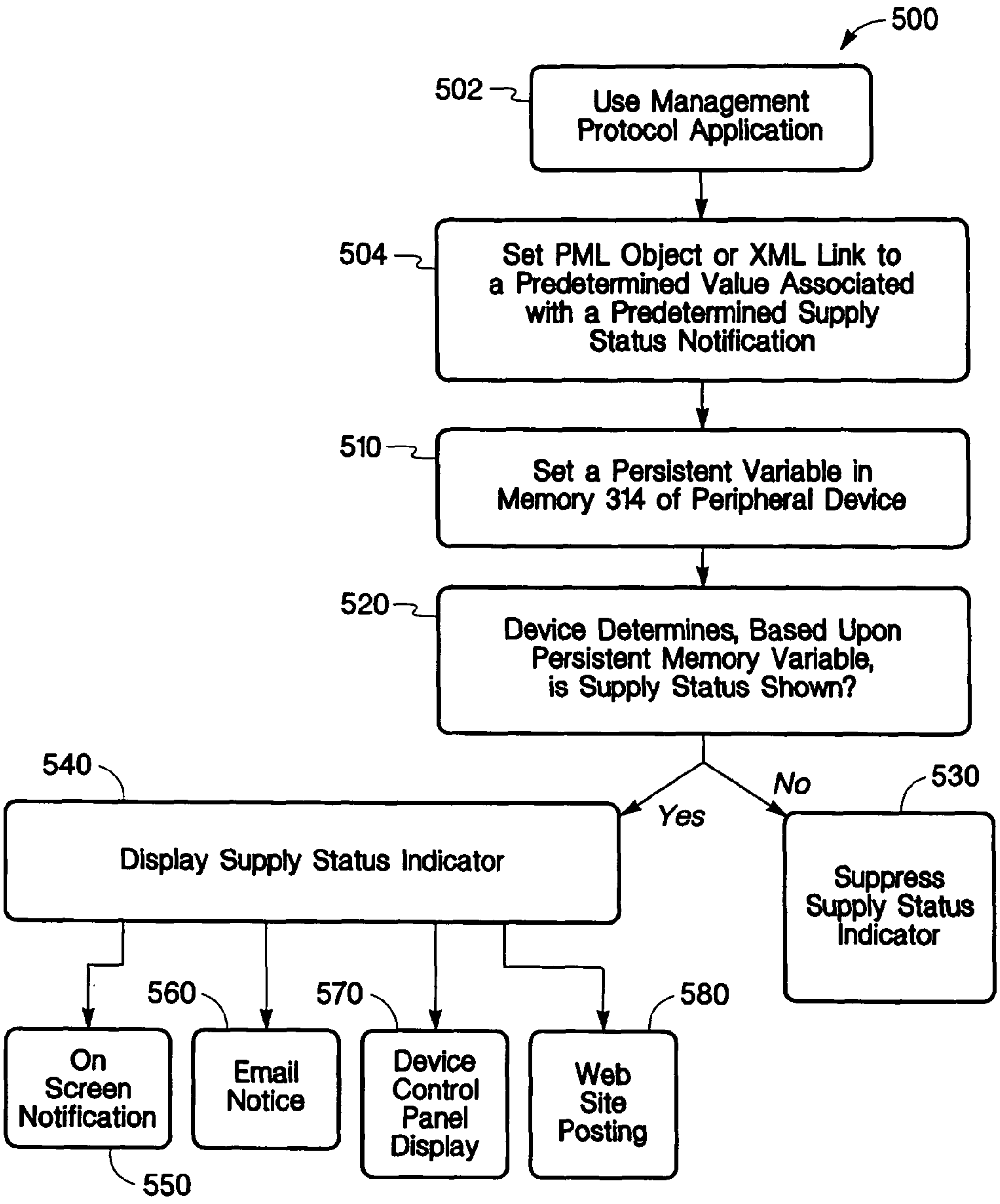
FIG. 4 is a flow chart illustrating an exemplary process of suppressing or displaying a supply status indicator.

FIG. 4 is a flow chart illustrating an exemplary process 500 of suppressing or displaying the first supply status indicator. At box 502, the management protocol application is used. At box 504, a PML object or an XML link of the administrative application 360 is set to a predetermined value associated with a predetermined status notification, such as a supply status notification, in an embodiment. At box 510, a persistent variable in the memory 314 of the device 104 is set, in an embodiment. At box 520, the device 140 determines whether the supply status is activated or suppressed based upon information from the persistent memory variable of box 510, in an embodiment. If box 520 is "No", such that the supply status is not displayed, then box 530 "Suppress supply status indicator" is next in the process. The supply status indicator is suppressed as described herein.

If box 520 is "Yes", such that the supply status is displayed, then box 540 "Display Supply Status Indicator" is next in the process. The supply status is displayed, in at least one or more of the following embodiments, such as described in boxes 550, 560, 570, and/or 580.

Figure 5:
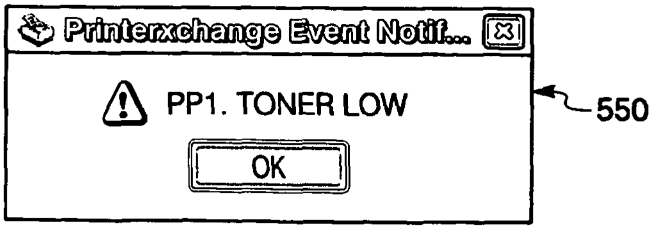
FIG. 5 illustrates a notification associated with a supply status indicator in an embodiment.

In the embodiment of FIG. 4, there is an on screen notification at box 550 of the supply status, such as a pop-up alert illustrated in FIG. 5. The pop-up notification or alert may be on the display screen of at least one of the managing host computer and client host computer to alert the user or the administrator, respectively, of supply(ies) status conditions such as the supply is low (i.e. time to reorder), and the supply is empty (i.e. time to replace the supply).

In the embodiment of box 560, there is an electronic mail notification of the supply status, such as sending an email of the supply status to an email address. In an embodiment, the email notification is sent to one or more email addresses, such as to the administrator and/or to the user as designated in the suppression option web pages 400, for example. In an embodiment, e-mail alerts are sent to administrators who are responsible for a large number of devices connected to the network.

In the embodiment of box 570, there is a display of the supply status indicator 150 on the device control panel 140, as previously discussed and illustrated in FIG. 1.

In the embodiment of box 580, there is a web site posting display of the supply status indicator. In an embodiment, the web site may have a list of maintained devices 104, and their respective associated status. In an additional embodiment, the web site may have a security feature, such as being password protected. In an additional embodiment, the web site is accessible through the supply status page 370, for example.

Figure 6:
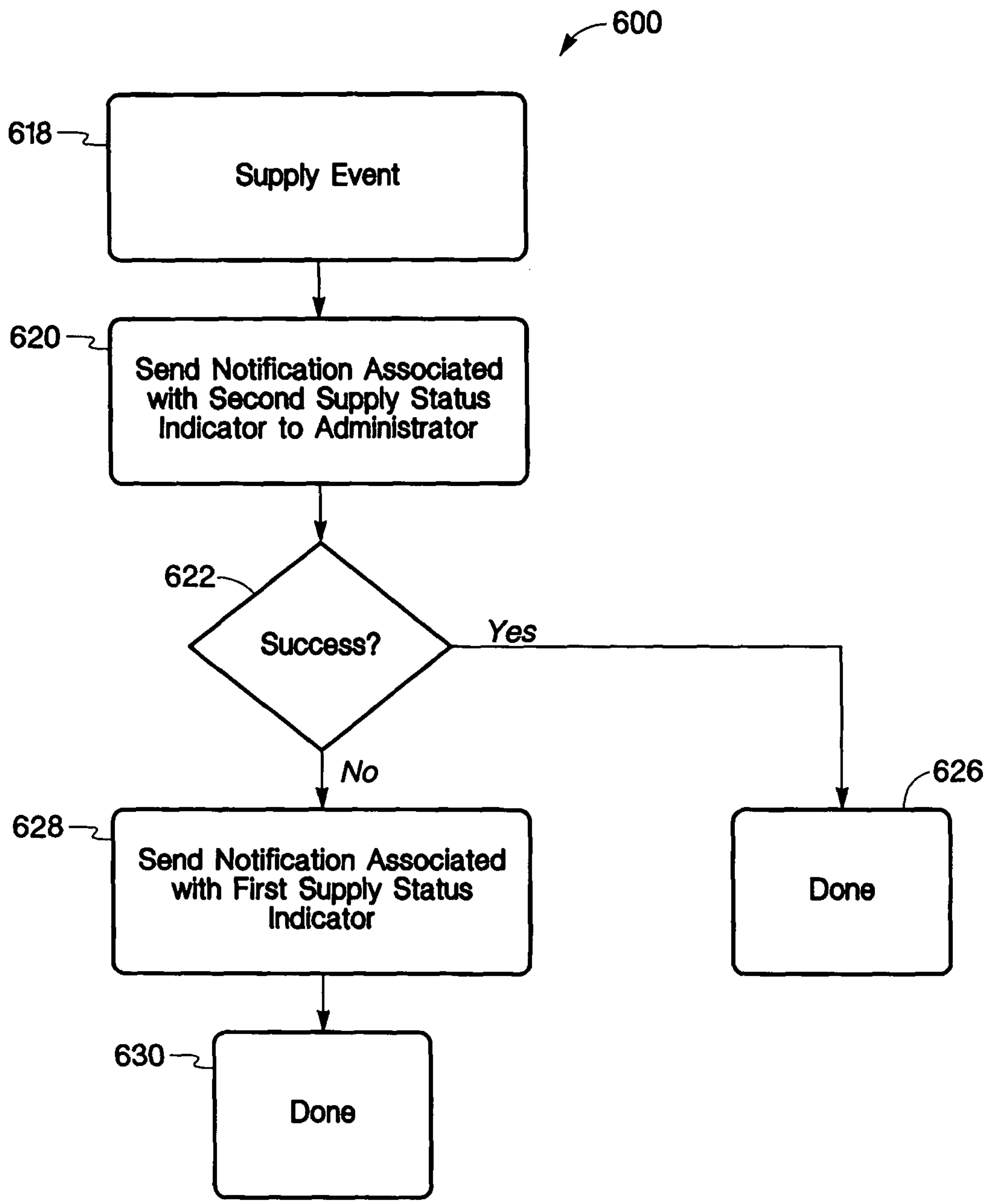
FIG. 6 is a flow chart illustrating an exemplary process of notification associated with the supply status indicators.

FIG. 6 is a flow chart illustrating an exemplary process 600 of notification associated with the supply status indicators. In an embodiment, the first supply status indicator is suppressed. In an embodiment, when in a suppressed state, the first supply status indicator at the device control panel 140, and/or to the end-user host computer 102A, and/or to any web page accessible by the end-user, the first supply status indicator is suppressed, hidden, or otherwise inaccessible. The second supply status indicator to the administrator remains activated, as described in more detail below.

In an embodiment, the supply event is at least one event including when the consumable is invalid, from an unknown source, missing, low, empty, unreadable, unauthorized, installed, an incorrect consumable, not engaged properly, with a memory error, genuine, and authorized. The supply event may be an error message or a warning message. An error message is one which is displayed when the device is not in service. A warning message is displayed to alert the user to an impending condition, but which does not prevent immediate printing. When a warning message is displayed, the user may mistakenly believe that the supply is not in service, for example. In that case, the user may prematurely replace the supply, for example or prematurely request that the administrator replace the supply, for example. In order to utilize the supplies to their full capacity and effectiveness, the first supply status indicator is not accessible (or is suppressed) to the end-user. However, the second supply status indicator is to be received by the administrator in this embodiment.

At box 618, a supply event is identified, for example, by the device 104. At box 620, notification associated with the second supply status indicator is sent to the administrator. At box 622 is a query of whether the second supply status indicator was successfully sent to the administrator, such as via the pop up alert, or email notification. If the answer to the query is yes, then the process is concluded, or "done" at box 626. In an embodiment, the first supply status indicator remains suppressed when the second supply status indicator is successfully received by an administrator. If the answer to the query is no, then the process moves to restore or activate the first suppressed supply status indicator in an activated state, such as displaying the supply status indicator 150 at the device control panel 140, and/or sending a pop up alert to the end-user host computer 102A, and/or to any web page accessible by the end-user, in embodiments. The process then moves to box 630 and is done. In an embodiment, when the notification at box 620 is unsuccessful indicated at box 622, the first supply status indicator for the end-user is activated or restored, and the administrator may reset the suppression of the first supply status indicator accordingly.

FIGS. 1 to 6 are merely representational and are not drawn to scale. Certain proportions thereof may be exaggerated, while others may be minimized. Many other embodiments will be apparent to those of skill in the art upon reviewing the above description. Parts of some embodiments may be included in, or substituted for, those of other embodiments.

While the foregoing examples of dimensions and ranges are considered typical, the various embodiments are not limited to such dimensions or ranges.

The illustrations of embodiments described herein are intended to provide a general understanding of the structure of various embodiments, and they are not intended to serve as a complete description of all the elements and features of apparatus and systems that might make use of the structures described herein. The accompanying drawings that form a part hereof show by way of illustration, and not of limitation, specific embodiments in which the subject matter may be practiced.

Applications that may include the apparatus and systems of various embodiments broadly include a variety of electronic and computer systems. The elements, materials, geometries, dimensions, and sequence of operations can all be varied to suit particular packaging requirements.

Embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of embodiments herein may be made without departing from the principles and scope of embodiments as expressed in the subjoined claims.

What is claimed is:

1. A system comprising:

a host computer to couple with a network;

a first supply status indicator to indicate a status of a consumable device component of a device to the device, wherein the first supply status indicator includes a suppressed state and an activated state; and a second supply status indicator to indicate the status of the consumable device component to at least one of a web site and the host computer, the second supply status indicator indicates the activated state while the first supply status indicator is suppressed, wherein the host computer includes an application having a supplies status page, wherein the supplies status page includes a supply status indicator switch to switch between the suppressed state and the activated state of the first supply status indicator.

2. The system of claim 1 wherein the application is only accessible by an administrator.

3. The system of claim 1 wherein the supply status indicator switch includes at least one of a toggle switch, a button and a box to check to indicate one of the suppressed state and the activated state of the first supply status indicator.

4. A system comprising:

a device having a consumable device component and to couple with a network;

a host computer to couple with the network;

first and second supply status indicators to indicate a status of the consumable device component to the first host computer and the device; and means for suppressing the first supply status indicator at the device while sending the second supply status indicator to the host computer, wherein the means for suppressing includes an application of the host computer, wherein the application has a supplies status page, wherein the supplies status page includes a supply status indicator switch to switch between a suppressed state and an activated state of the first supply status indicator.

5. A process comprising:

suppressing a first supply status indicator of a consumable device component of a managed device on the managed device, while a condition exists at the managed device to activate the supply status indicator; and sending a notification of the condition to activate the first supply status indicator as a second supply status indicator of the consumable device component to a second host computer, wherein the host computer includes an application having a supplies status page, wherein the supplies status page includes a supply status indicator switch to switch between a suppressed state and an activated state of the first supply status indicator.

6. A process comprising:

switching to a suppressed state from an activated state of a notification associated with a first supply status indicator of a consumable device component of a managed device to the managed device when the conditions for the activated state are present at the managed device; and sending a notification of the activated state as a second supply status indicator of the consumable device component to at least one of a website and a host computer, wherein the notification of the first supply status indicator is switched to the activated state when the second supply status indicator is not received by either the website or the host computer.

7. A process comprising:

switching to a suppressed state from an activated state of a notification associated with a first supply status indicator of a consumable device component of a managed device to the managed device when the conditions for the activated state are present at the managed device;

sending a notification of the activated state as a second supply status indicator of the consumable device component to at least one of a website and a host computer;

installing a management protocol application on the second host computer;

setting an object of the management protocol to a predetermined value associated with at least one of activating and suppressing the notification of the second supply status indicator; and setting a persistent memory variable in the managed device associated with the object to switch to an appropriate state between the activated state and the suppressed state.

8. A computer readable medium comprising:

a management protocol application to execute on an administrative computer to suppress a supply status indicator of a consumable peripheral component on a managed peripheral coupled to the administrative computer, wherein the supply status indicator is suppressed from being displayed on the managed peripheral while being maintained at the administrative computer, wherein the management protocol application includes an interface having a switch to switch between a suppressed state of the supply status indicator, and an activated state of the supply status indicator.

9. The computer readable medium of claim 8 wherein the switch includes at least one of a toggle switch, a button, and a box to check to indicate the suppressed state and the activated state accordingly.

* * * * *